(12) United States Patent
Peterson et al.

(10) Patent No.: US 10,776,849 B2
(45) Date of Patent: Sep. 15, 2020

(54) VISUALLY IDENTIFYING PRODUCTS

(71) Applicant: LENOVO (Singapore) PTE, LTD., New Tech Park (SG)

(72) Inventors: Nathan J. Peterson, Durham, NC (US); John Carl Mese, Cary, NC (US); Russell Speight VanBlon, Raleigh, NC (US); Rod D. Waltermann, Rougemont, NC (US); Arnold S. Weksler, Raleigh, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 987 days.

(21) Appl. No.: 14/560,993

(22) Filed: Dec. 4, 2014

(65) Prior Publication Data

US 2016/0162971 A1 Jun. 9, 2016

(51) Int. Cl.
*G06Q 30/06* (2012.01)

(52) U.S. Cl.
CPC ..... *G06Q 30/0627* (2013.01); *G06Q 30/0639* (2013.01); *G06Q 30/0643* (2013.01)

(58) Field of Classification Search
CPC .......... G06Q 30/0627; G06Q 30/0639; G06Q 30/0643
USPC ...................................... 705/26.63
See application file for complete search history.

(56) References Cited

U.S. PATENT DOCUMENTS

| | | | | |
|---|---|---|---|---|
| 2007/0158417 A1* | 7/2007 | Brewington | ........... | G06Q 30/06 235/383 |
| 2012/0099756 A1* | 4/2012 | Sherman | ............. | G07G 1/0063 382/100 |
| 2012/0183185 A1* | 7/2012 | Grigsby | ............ | G06F 17/30256 382/128 |
| 2012/0323620 A1* | 12/2012 | Hofman | ................. | G06Q 10/06 705/7.11 |
| 2013/0159097 A1* | 6/2013 | Schory | ............... | G06Q 30/0261 705/14.49 |
| 2014/0156459 A1* | 6/2014 | Zises | .................. | G06Q 30/0643 705/26.61 |
| 2014/0180874 A1* | 6/2014 | Zhao | .................. | G06Q 30/0643 705/26.61 |

(Continued)

OTHER PUBLICATIONS

Anonymous, Made in IBM Labs: New Augmented reality App to Give In-Store Shoppers Instant Product Details and Promotions in the Palms of Their Hands, Jul. 2, 2012, M2 Presswire, pp. 1-3. (Year: 2012).*

*Primary Examiner* — Jason B Dunham
*Assistant Examiner* — Brittany E Bargeon
(74) *Attorney, Agent, or Firm* — Kunzler Bean & Adamson

(57) ABSTRACT

For visually indicating a product location, a system, apparatus, method, and computer program product are disclosed. The apparatus, in one embodiment, includes an image sensor, a product image module that identifies at least one product within image data, a product matching module that compares the identified at least one product to a user-specified product, and a location module that indicates, to the user, a location of a product matching the user-specified product. In some embodiments, the apparatus may also include a product selection module that receives, from the user, a user-selected product and at least one product constraint, wherein the product matching module further compares the identified at least one product to the at least one product constraint.

19 Claims, 6 Drawing Sheets

(56) References Cited

U.S. PATENT DOCUMENTS

| | | | |
|---|---|---|---|
| 2014/0279246 A1* | 9/2014 | Chen | G06F 16/9535 |
| | | | 705/26.61 |
| 2015/0058030 A1* | 2/2015 | Scantland | G06F 19/328 |
| | | | 705/2 |
| 2015/0073925 A1* | 3/2015 | Renfroe | G06Q 50/12 |
| | | | 705/15 |
| 2016/0148292 A1* | 5/2016 | Gupta | G06Q 30/0623 |
| | | | 705/26.61 |

* cited by examiner

VISUALLY IDENTIFYING PRODUCTS

BACKGROUND

Field

The subject matter disclosed herein relates to visually identifying products and more particularly relates to visually indicating a location of a specified product and identifying alternate products based on ingredient choices.

Description of the Related Art

With many products crowding store shelves today, it is often very difficult for a customer to find what they are looking for especially if the product they are looking for is out of stock. Further, it can be very difficult for a customer to find products that have or don't have specific ingredients, for example items containing no gluten.

BRIEF SUMMARY

An apparatus for visually indicating a product location is disclosed. A method and system also perform the functions of the apparatus. The apparatus, in one embodiment, includes an image sensor, a product image module that identifies at least one product within image data, a product matching module that compares the identified at least one product to a user-specified product, and a location module that indicates, to the user, a location of a product matching the user-specified product. In certain embodiments, the product matching module sends the image data to a remote computer for image analysis and receives, from the remote computer, a list of products within the image data.

In some embodiments, the apparatus may also include a product selection module that receives, from the user, a user-selected product and at least one product constraint, wherein the product matching module further compares the identified at least one product to the at least one product constraint. In some embodiments, the apparatus may also include a purchase history module that suggests at least one suggested product based on the user's purchase history, wherein the location module is further configured to indicate locations of the at least one alternative product.

In some embodiments, the apparatus may also include an alternative product image module that suggests at least one alternative product based on the user-specified product, wherein the location module further indicates locations of the at least one alternative product. In some embodiments, the apparatus may also include a price module that determines a price for the identified at least one product, wherein the location module further indicates a price for the at least one matching product.

In some embodiments, the apparatus may also include a product information module that determines a plurality of product characteristics for the user-specified product and for each of the identified at least one product, wherein the product matching module compares the product characteristics of the user-specified product to the product characteristics for each of the identified at least one product.

In some embodiments, the apparatus may also include a display module that visually marks the at least one product matching the user-specified product within the image data, wherein the location module causes the display module to visually indicate locations for the at least one matching product. In some embodiments, the apparatus may also include a barcode module that identifies a barcode within image data, the barcode associated with the at least one product within image data, wherein the product image module identifies the at least one product based on the barcode.

The method, in one embodiment, includes receiving, by use of a processor, a product selection from a user, identifying a plurality of products within image data, and indicating, to the user, one or more products matching the product selection. In certain embodiments, receiving a product selection from a user may include receiving a search constraint from the user, wherein indicating one or more products matching the product selection comprises comparing the identified plurality products to the search constraint.

In certain embodiments, identifying a plurality of products from image data may include transmitting the image data to a remote computer for image analysis, and receiving, from the remote computer, a list of products within the image data and a list of locations within the image data for each listed product, wherein indicating one or more products matching the product selection includes indicating locations for the one or more matching products. In certain embodiments, indicating one or more products matching the product selection may include comparing the identified plurality products to the product selection, and visually marking the one or more products matching the product selection within the image data.

In some embodiments, the method may also include determining a price associated with each of the plurality of identified products, wherein indicating the one or more matching products includes indicating the price associated with each of the one or more products matching the product selection. In some embodiments, the method may also include identifying the user, obtaining a purchase history associated with the user, identifying one or more suggested products based on the purchase history, determining whether the one or more suggested products are present within the image data, and suggesting the one or more suggested products to the user, in response to the one or more suggested products being present within the image data.

In some embodiments, the method may also include identifying at least one alternative product based on the product selection, determining whether the at least one alternative product is present within the image data, and suggesting the at least one alternative product to the user, in response to the at least one alternative product being present within the image data. In certain embodiments, identifying at least one alternative product based on the product selection may include determining a plurality of ingredients for the product selection, determining a product class for the product selection, and identifying at least one alternative product having the same ingredients and the same product class as the product selection.

The system, in one embodiment, may include an image sensor, a display, a product selection module that receives a product selection from the user, a product image module that identifies a one or more products within image data, a product matching module that determines at least one product matching the product selection from the identified one or more products, and a location module that indicates, on the display, locations of the at least one matching product.

In some embodiments, the system may also include an alternative product image module that suggests at least one alternative product based on the product selection, wherein the location module further displays a location of the at least one alternative product. In some embodiments, the system may also include a purchase history module that suggests at least one suggested product based on the user's purchase history, wherein the location module further displays a location of the at least one alternative product.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
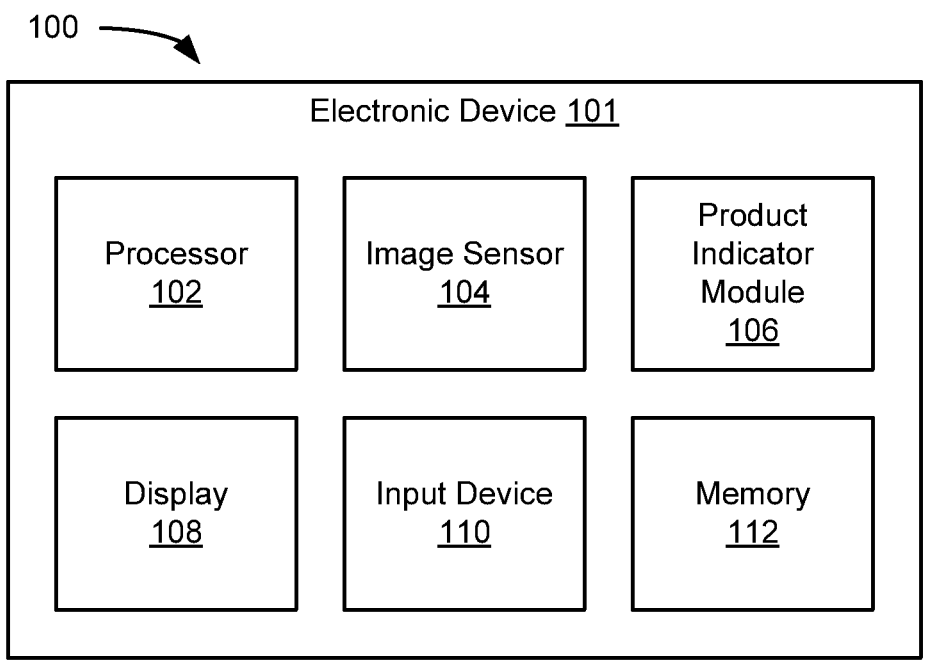
FIG. 1 is a schematic block diagram illustrating one embodiment of a system for visually indicating a product location.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the disclosed systems, apparatuses, methods, and computer program products identifies a plurality of products within image data and indicates, to the user, one or more products matching a user-specified product. For example, the disclosed systems, apparatuses, methods, and computer program products may be embodied in a wearable device or mobile device. Using a camera, the wearable or mobile device may scan items near the user. The wearable device may then visually indicate the location of a product the user is looking for. Additionally, the wearable device may suggest alternatives based on price or availability based on a product the user is looking for.

For example, if the user wants NyQuil, the wearable device locates the NyQuil, but also locates items that contain the same ingredients and are registered as equivalent and also point these items out to the user. Additionally, as another example the user to be interested in things with, for example, no gluten. The wearable device could scan items around the user and pinpoint items that the user is interested in based on dietary requirements or the like.

FIG. 1 depicts a system 100 for visually indicating a product location, according to embodiments of the disclosure. The system 100 includes an electronic device 101 having a processor 102, an input device 110, a display 108, a product indicator module 106, and a memory 112. In some embodiments, the electronic device 101 is a wearable device. For example, the electronic device 101 may comprise a wearable heads-up display, an augmented reality device, or the like. In some embodiments, the electronic device 101 is a handheld computer, such as a smart phone, a tablet computer, a personal digital assistant (PDA), or another suitable computing device.

In some embodiments, the electronic device 101 includes a body or an enclosure, wherein the components of the electronic device 101 are contained within the enclosure. In some embodiments, the electronic device 101 includes a power source, for example a battery or a power adapter, which provides electrical power to components of the electronic device 101. In certain embodiments, components of the electronic device 101 are communicatively coupled to each other, for example via a computer bus or via a wireless connection. In further embodiments, the electronic device 101 may be communicatively coupled to a networked device (e.g., a remote computer) via a network interface. The network interface may allow communications with the networked device via wired and/or wireless network connections.

In some embodiments, a wireless connection may include a Wi-Fi network based on any one of the Institute of Electrical and Electronics Engineers (IEEE) 802.11 standards. Alternatively, the wireless connection may include a BLUETOOTH® connection. In addition the wireless connection may employ a Radio Frequency Identification (RFID) communication including RFID standards established by the International Organization for Standardization (ISO), the International Electrotechnical Commission (IEC), the American Society for Testing and Materials (ASTM), the DASH7 Alliance, and EPCGlobal. Alternatively, the wireless connection may employ a ZigBee connection based on the IEEE 802 standard. In one embodiment, the wireless connection employs a Z-Wave connection as designed by Sigma Designs. Alternatively, the wireless connection may employ an ANT and/or ANT+ connection as defined by Dynastream Innovations Inc. of Cochrane, Canada.

The wireless connection may be an infrared connection including connections conforming at least to the Infrared Physical Layer Specification (IrPHY) as defined by the Infrared Data Association (IrDA). Alternatively, the wireless connection may be a cellular telephone network communication. All standards and/or connection types include the latest version and revision of the standard and/or connection type as of the filing date of this application.

The processor 102, in one embodiment, may comprise any known controller capable of executing computer-readable instructions and/or capable of performing logical operations. For example, the processor 102 may be a microcontroller, a microprocessor, a central processing unit (CPU), a graphics processing unit (GPU), an auxiliary processing unit, a FPGA, or similar programmable controller. In some embodiments, the processor 102 executes instructions stored in the memory 112 to perform the methods and routines described herein. The processor 102 is communicatively coupled to image sensor 104, the product indicator module 106, the display 108, the input device 110, and the memory 112.

The image sensor 104, in one embodiment, may comprise any known sensor for capturing an image, including a digital camera, one or more photoelectric sensors, or the like. The image sensor 104 captures images of a scene before the user (e.g., of a store shelf). In some embodiments, the image sensor 104 captures images of sufficient quality to allow the product indicator module 106 to identify a product, for example, by examining physical characteristics of the product, such as size, shape, color, and the like. In some embodiments, the image sensor 104 identifies barcode data, text data, or shape data from the image data, as discussed in further detail below with reference to FIG. 2.

The product indicator module 106, in one embodiment, is configured to identify a plurality of products within image data received from the image sensor 104, to compare the identified plurality of products to a user-specified product, and to indicate, to the user, locations of at least one product matching the user-specified product. In some embodiments, the product indicator module 106 also receives, from the user, a user-selected product and at least one product constraint and compares the identified plurality of products to the at least one product constraint. In some embodiments, the product indicator module 106 also suggests at least one suggested product based on the user's purchase history and indicates a location of the same. In some embodiments, the product indicator module 106 also suggests at least one alternative product based on the user-specified product and indicates a location of the same.

The product indicator module 106 may be comprised of computer hardware, computer software, or a combination of both computer hardware and computer software. For example, the product indicator module 106 may comprise circuitry, or a processor, configured to identify a plurality of products within image data. As another example, the product indicator module 106 may comprise computer program code that allows the processor 102 to indicate locations of at least one product matching the user-specified product.

The product indicator module 106, in one embodiment, is configured to receive electronic communications (e.g., a phone call, a video call, or a text message) via a network interface for a data network. The product indicator module 106 is discussed in further detail with reference to FIG. 2, below.

The display 108, in one embodiment, is configured to output visual data, such as images. For example, the display 108 may include an LCD display, an LED display, an OLED display, a projector, or similar display device capable of outputting images, text, or the like to a user. In some embodiments, the display 108 includes a wearable external display, such as a virtual reality headset, communicatively coupled to the electronic device 101. In certain embodiments, the display 108 includes one or more speakers for producing sound, such as an audible prompt or notification.

In some embodiments, all or portions of the display 108 may be integrated with the input device 110. For example, the input device 110 and display 108 may form a touchscreen or similar touch-sensitive display. In other embodiments, the display 108 may be located near the input device 110. The display 108 may receive instructions and/or visual data for output from the processor 102 and/or the product indicator module 106. In yet other embodiments, the display 108 may be physically separate from, yet communicatively coupled to, other components of the electronic device 101. Thus, the display 108 may receive instructions and/or visual data for output via a wired or wireless data link. For example, the display 108 may be a wearable display that communicates with the processor 102 and/or the product indicator module 106 via a BLUETOOTH link or other short-range wireless data link.

The input device 110, in one embodiment, may comprise any known computer input device including a touch panel, a button, a keyboard, a microphone, and the like. The input device 110 may receive user input, such as a product selection and provide the user input to the product indicator module 106. In some embodiments, the input device 110 may be integrated with the display 108, for example, as a touchscreen or similar touch-sensitive display. In some embodiments, the input device 110 comprises a touchscreen such that text may be input by using a virtual keyboard displayed on the touchscreen and/or by handwriting on the touchscreen. In some embodiments, the input device 110 comprises two or more different devices, such as a microphone and a touch panel.

The memory 112, in one embodiment, is a computer readable storage medium. In some embodiments, the memory 112 includes volatile computer storage media. For example, the memory 112 may include a random access memory (RAM), including dynamic RAM (DRAM), synchronous dynamic RAM (SDRAM), and/or static RAM (SRAM). In some embodiments, the memory 112 includes non-volatile computer storage media. For example, the memory 112 may include a hard disk drive, a flash memory, or any other suitable non-volatile computer storage device.

In some embodiments, the memory 112 includes both volatile and non-volatile computer storage media.

In some embodiments, the memory 112 stores data relating to visually indicating a product location. For example, the memory 112 may store image data, a product selection, a product constraint, product characteristics, and the like. In some embodiments, the memory 112 also stores program code and related data, such as an operating system operating on the electronic device 101.

Figure 2:
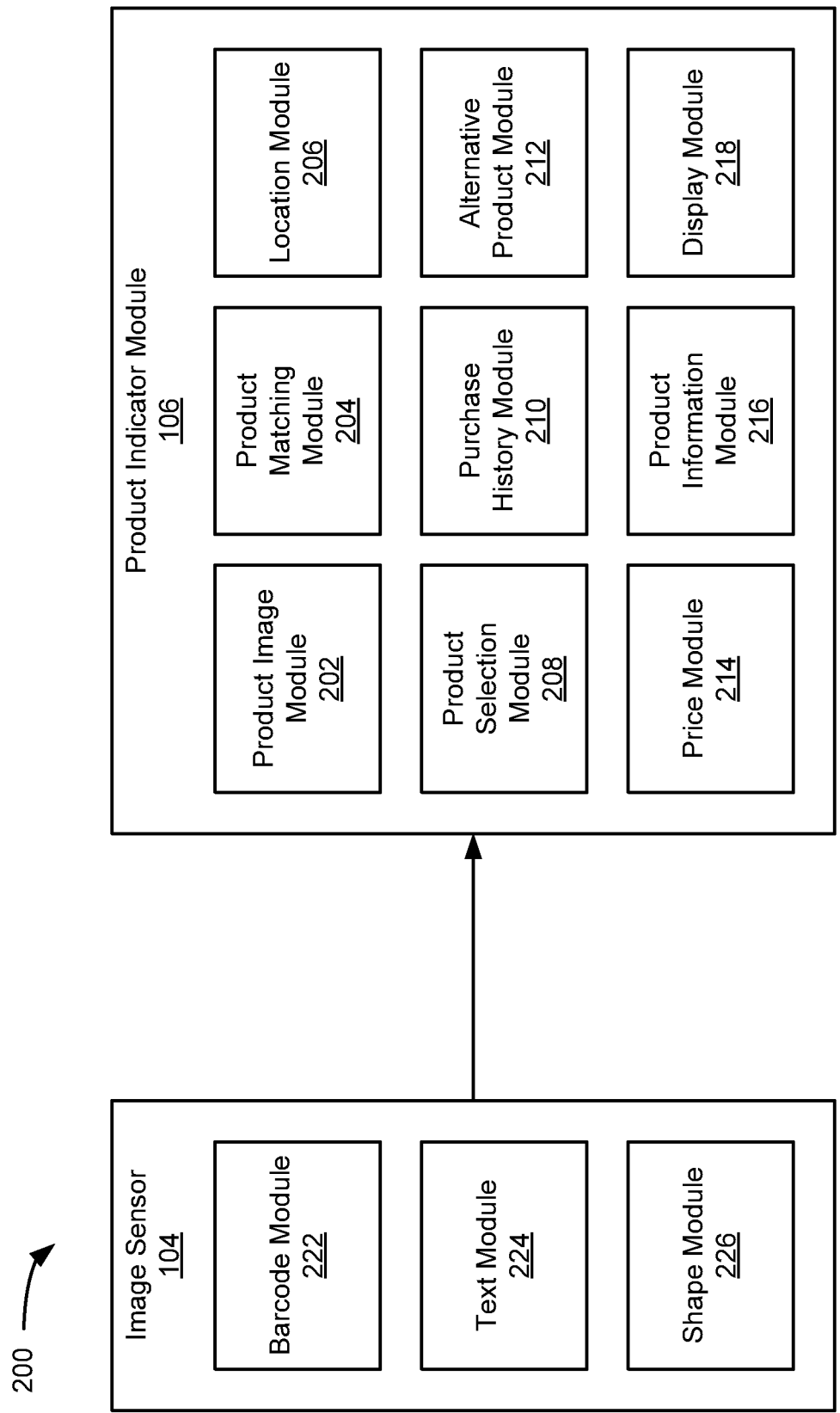
FIG. 2 is a schematic block diagram illustrating one embodiment of an apparatus for visually indicating a product location.

FIG. 2 depicts an apparatus 200 for visually indicating a product location, according to embodiments of the disclosure. The apparatus 200 includes an image sensor 104 communicatively coupled to a product indicator module 106, each of which may be substantially similar to the image sensor 104 and the illumination adjustment module 106 described above with reference to FIG. 1. In some embodiments, the apparatus 200 may be part of an electronic device, such as the electronic device 101.

In general, as described above, the apparatus 200 captures image data, identifies a plurality of products within image data, compares the identified plurality of products to a user-specified product, and indicates, to the user, locations of at least one product matching the user-specified product. In some embodiments, the apparatus 200 receives, from the user, a user-selected product and at least one product constraint and compares the identified plurality of products to the at least one product constraint. In some embodiments, the apparatus 200 suggests at least one suggested product based on the user's purchase history and indicates a location of the same. In some embodiments, the apparatus 200 suggests at least one alternative product based on the user-specified product and indicates a location of the same.

The product indicator module 106, in one embodiment, includes a product image module 202, a product matching module 204, and a location module 206. In some embodiments, the product indicator module 106 also includes one or more of a product selection module 208, a purchase history module 210, an alternative product module 212, a price module 214, a product information module 216, and/or a display module 218. The image sensor 104, in one embodiment, includes one or more of a barcode module 222, a text module 224, and/or a shape module 226. The modules of the image sensor 104 and the product indicator module 106 may be communicatively coupled to one another.

The product image module 202, in one embodiment, is configured to identify at least one product within image data. For example, a digital photograph of a store shelf may contain a plurality of products within image data, the product image module 202 being configured to identify each product within image data. In some embodiments, the product image module 202 is further configured to identify a location of each identified product. The location may be in relation to other products, to a marker in the image (e.g., a shelf) and/or to coordinates within the image data (e.g., pixel coordinates). For example, the location for a particular product may be identified as being the third product from the right on the top shelf and centered at a particular pixel of the image data.

In some embodiments, the product image module 202 performs a visual analysis of the image data. The product image module 202 may identify a product based on shape, color, label, and the like. For example, a soft drink beverage may be identified based on a bottle shape and color. In one embodiment, the product image module 202 identifies a product based on recognized text within the image data. For example, a text from a product label may be recognized and used to identify the product. As another example, text from a retail shelf price tag may be recognized and used to identify the product.

In certain embodiments, the product image module 202 may identify a product by sending the image data to a remote server, wherein the remote server analyzes the image data. The remote server may then return a list of the plurality of products within the image data. In further embodiments, the remote server may also return locations within the image data of each identified product.

In some embodiments, the product image module 202 identifies one or more products within the image data based on a barcode associated with the product. For example, the product image module 202 may recognize a barcode on or near the product (e.g., on a shelf upon which the product rests) and identify the product based on the barcode. In some embodiments, the product image module 202 may send the portion of the image data that contains the barcode to another module within the electronic device 101 or to a remote computer for recognition of the barcode.

In some embodiments, the product image module 202 includes at least one image analysis engine capable of analyzing the image data to identify products. In other embodiments, the product image module 202 may be communicatively coupled to one or more image analysis engines located within the electronic device 101, wherein the product image module 202 identified the products within the image data based on results from the one or more image analysis engines. Example of image analysis engines include: a barcode reader, a text/character recognition engine, a shape recognition engine, a pattern recognition engine, and the like. In yet other embodiments, the product image module 202 may transmit the image data to a remote computer for image analysis and receive, from the remote computer, a list of products within the image data, wherein the remote computer includes at least one image analysis engine capable of analyzing the image data to identify products.

The product matching module 204, in one embodiment, is configured to compare the identified at least one product to a user-specified product to determine whether any identified products match the user-specified product. In some embodiments, the product matching module 204 compares characteristics of each identified product to those of the user-specified product. Examples of comparable product characteristics include, but are not limited to, product names, product ingredients or components, product identifiers (e.g., product/model numbers), product brands or manufacturers, product origin (e.g., location of manufacture) product sizes, product and/or packaging shapes, and the like.

The user-specified product may be any product that the user desires to locate and/or purchase. In some embodiments, the user specifies only the name of the product, while in other embodiments the user may specify additional attributes of the product (e.g., size, color, and brand). The user-specified product may be received via text input, voice input, and/or menu selection. In some embodiments, the user-specified product is received via the product selection module 208.

In certain embodiments, the product matching module 204 retrieves the product characteristics from a database, either a local database stored in the memory 112 or a remote database accessible via a network interface. For example, the product matching module 204 may query a remote server for product characteristics of the user-selected product and each identified product. The product matching module 204 may retrieve values for one or more specific product characteristics associated with a product or may retrieve a list or table containing a plurality of values corresponding to a plurality of comparable product characteristics associated with a product. For example, the product matching module 204 may query the database for specific product characteristic values or a general list of all known product characteristics.

In some embodiments, the product matching module 204 further compares the identified plurality of products to at least one product constraint. The product constraint may be a user-specified product characteristic required of any matching products. Examples of product constraints include, but are not limited to, that the product includes a specific ingredient or component, that the product does not include a specific ingredient or component, that the product is within a certain size range or price range, that a product characteristic has a certain value, and the like. Thus, the product matching module 204 may filter a list of otherwise-matching products to include only those with a specific product constraint. For example, the user-specified product may be the drug ibuprofen and the user may specify it be dye-free. The product matching module 204 may then determine whether any identified products match the drug ibuprofen and whether any matching products are dye-free.

The location module 206, in one embodiment, is configured to indicate, to the user, a location of a product matching the user-specified product. The location may be in relation to other products and/or to a marker in the image (e.g., a shelf). In some embodiments, the location module 206 indicates all matching products. In other embodiments, the location module 206 may indicate up to a predefined number of matching products. For example, the location module 206 may indicate up to five matching products at a time. Where the location module 206 indicates a limited number of products the location module 206 may indicate those products that best match the user-specified product. In certain embodiments, the location module 206 may indicate to the user that no products within the image data match the user-specified product.

In some embodiments, the location module 206 indicates the location by visually marking the one or more products matching the product selection within the image data. The visual mark may be selected to attract the user's attention. For example, the location module 206 may instruct the display module 218 to indicate a product's location on the shelf by highlighting the product on the display 108. As another example, the location module 206 may indicate a product's location by drawing a boundary around the product (e.g., outlining the product) or by superimposing an indicator (e.g., an icon or cursor) on the product. In some embodiments, the location module 206 indicates the location by audibly announcing the location to the user. For example, the location module 206 may audibly specify an on-shelf location of a product (e.g., second from the left on the top shelf) using a speaker.

In some embodiments, the location module 206 may further indicate one or more product characteristics of the matching products. For example, the location module 206 may indicate sizes, brands, or prices of the matching products. In certain embodiments, the location module 206 inserts price information into the image data at a location adjacent to the corresponding product. For example, the location module 206 may superimpose a price for a product as a pop-up window near the location of the corresponding product. In certain embodiments, the location module 206 may indicate specific ingredients or components of the matching products. In further embodiments, the location module 206 may present a pop-up window adjacent to a matching product, the pop-up containing a link to a detailed product description containing the product characteristics.

In some embodiments, the location module 206 may display a comparison between two or more matching products. For example, the location module 206 may indicate that two allergy medications differ in size, in brand, and/or in active ingredient. In further embodiments, the location module 206 may present a pop-up window adjacent the two or more matching products, the pop-up containing a link to a detailed comparison of the two or more matching products. In certain embodiments, the location module 206 instructs the display module 218 to display the pop-up and the detailed comparison.

In certain embodiments, the location module 206 may indicate locations of one or more suggested products and/or one or more alternative products. The suggested products may include product suggestions based on a user's purchase history. The alternative products may include products similar to the user-specified product, but differing in a particular characteristics (e.g., size or brand). In some embodiments, the location module 206 indicates the price for the suggested product, and/or for the alternative product. In some embodiment, the location module 206 may indicate one or more product characteristics of the suggested product and/or the alternative product. For example, the location module 206 may indicate that a particular medication is a viable alternative to the user-selected product as both include the same active ingredients at the same concentrations.

The product selection module 208, in one embodiment, is configured to receive a user-selected product from the user, for example via the input device 110. In some embodiments, the product selection module 208 may receive inputted text denoting the user-selected product. For example, the user may type the product selection using a virtual keyboard displayed on a touchscreen. In some embodiments, the product selection module 208 may receive voice input denoting the user-selected product. In one embodiment, the product selection module 208 include a voice recognition algorithm for identifying the user-selected product from the voice input. For example, the user may speak the product selection into a microphone and the spoken product selection may be converted to computer-usable text corresponding to the product selection.

In some embodiments, the product selection module 208 presents a menu to the user and receives a selection from the menu, the selection denoting the user-selected product. In certain embodiments, the menu may comprise a plurality of prompts wherein the product selection is determined based the user's responses to the plurality of prompts. The plurality of prompts, in one embodiment, may include prompts regarding a product's size, color, brand, manufacturer, class or category, and the like. The menu may be automatically presented or may be presented in response to a user command. In some embodiments, the product selection module 208 may instruct the display module 218 to visually present the menu. In other embodiments, the product selection module 208 may present the menu in audible form, wherein the user verbally selects a menu item.

In some embodiments, the product selection module 208 receives at least one product constraint from the user, wherein the product matching module 204 further compares the identified plurality of products to the at least one product constraint. A product constraint may be a user-specified product characteristic required of any matching products, such as the product including and/or excluding a specific ingredient, component, or feature, the product being within a certain size range or price range, the product being from a particular brand or manufacturer, the product having a particular color or shape, and the like. For example, a user may search for a television and specify that the television be Energy Star certified and include four different input ports. The product selection module 208 may then provide the product constraint to the product matching module 204, wherein the product matching module 204 filters a list of otherwise-matching products to include only those with the product constraint.

The purchase history module 210, in one embodiment, is configured to suggest at least one suggested product based on the user's purchase history, wherein the location module 206 is further configured to indicate locations of the at least one suggested product. In some embodiments, the user's purchase history may include previous purchases at a store where the user is presently located. For example, if the user is at a drug store the purchase history module 210 may consider previous purchases from the drug store and suggest one or more products to the user. In other embodiments, the user's purchase history may include previous purchases at any store selling items similar to those in the image data. For example, the purchase history module 210 may access a list of previous purchases within a particular class or category, for example, medicine, produce, cleaning products, consumer electronics, and the like.

In some embodiments, the purchase history module 210 receives a list of products identified within the image data and determines whether any previously purchased items are present within the image data. In certain embodiments, the purchase history module 210 determines when the previous purchase occurred and suggest the previously purchased item only if a purchase timeline threshold is exceeded. For example, the purchase history module 210 may suggest shaving products only if the last purchase was more than a month ago. The purchase timeline threshold may be determined by the purchase history module 210 and/or may be user-selectable.

In some embodiments, the purchase history module 210 identifies a purchasing pattern for one or more recurring purchases and suggests one or more suggested products based on the purchasing pattern. For example, the purchase history module 210 may identify that the user purchases hair care products approximately once every three months. The purchase history module 210 may then suggest a product corresponding to the recurring purchase according to the purchasing pattern. In further embodiments, the purchase history module 210 may set the purchase timeline threshold based on the purchasing pattern.

In some embodiments, the purchase history module 210 identifies a purchasing trend and suggests one or more suggested products based on purchasing trend. The purchasing trend may be based on a product characteristic, such as an ingredient, a brand, a color, or the like. For example, the purchase history module 210 may determine that the user is purchasing fat-free food items and may suggest one or more fat-free food products matching the user's purchase history. In further embodiments, the purchase history module 210 may cause the location module 206 to indicate with emphasis those matching products that also fit the purchasing trend.

In some embodiments, the purchase history module 210 may receive user input defining a shopping list. For example, the user may create a list of items he or she wishes to purchase, wherein the purchase history module 210 suggests one or more suggested products on the shopping list. In some embodiments, the user inputs the shopping list via the input device 108. In other embodiments, the user sends the shopping list as a data transmission to the purchase history module 210. For example, the user may have the shopping list on a smart phone or tablet computer and may send the list to the electronic device 101, such as via a BLUETOOTH link or as an email attachment. As another example, the user may store the shopping list on a network storage device wherein the purchase history module 210 downloads the shopping list from the network storage device. In yet other embodiments, the user may scan or take a photo of a handwritten shopping list, wherein the purchase history module 210 identifies the items of the shopping list using a text recognition algorithm.

The user's purchase history may be acquired from a variety of sources. In certain embodiments, the purchase history module 210 acquires the purchase history from a store rewards program or other store program that tracks a user's purchases. In certain embodiments, the purchase history module 210 acquires the purchase history from a bank card or bank statement. In certain embodiments, the purchase history module 210 acquires the purchase history from scanned receipts belonging to the user. In some embodiments, the purchase history module 210 may infer a purchase history based on a user-inputted shopping list. In further embodiments, the purchase history module 210 may prompt the user to manually input a purchase decision and build the purchase history based on the user input.

In some embodiments, the purchase history module 210 identifies the user prior to suggesting the at least one suggested product. The user may be identified by an active user account, by a username, by a fingerprint analysis, by a voiceprint analysis, by an image analysis, or the like. For example, the purchase history module 210 may prompt the user to identify him- or herself when the product indicator module 106 is initialized. The purchase history module 210 may then obtain a purchase history associated with the user based on the user identity.

The alternative product image module 212, in one embodiment, is configured to suggest at least one alternative product based on the user-specified product. The alternative products may include products similar to the user-specified product, but differing in a particular characteristics (e.g., size or brand). In some embodiments, the alternative product module 212 determines the price and/or location for each alternative product, wherein the location module 206 further indicates the price and/or location for each alternative product.

In some embodiments, the alternative product module 212 identifies one or more generic products corresponding to the user-specified product. For example, if the user-specified product is a brand-name skin care product, the alternative product module 212 may query a network database to identify one or more generic skin care products corresponding to the brand-name skin care product. In some embodiments, the alternative product module 212 identifies a class or category associated with the user-selected product and determines one or more alternative products based on the class or category. For example, where the user selection is a particular brand of hair care product, the alternative product module 212 may suggest other hair care products having the same purpose (e.g., for coloring hair or for styling hair).

In some embodiments, the alternative product module 212 identifies one or more product characteristics of the user-selected product and determines one or more candidate products based on similar product characteristics. For example, if the user-selected product is a brand name pain reliever, the alternative product module 212 may determine one or more products having the same active ingredient and concentration. In one embodiment, the alternative product module 212 identifies product characteristics of the identified products and selects alternative products that differing in only one or two product characteristics from the user-selected product. For example, the alternative product module 212 may identify as alternative products a product differing from the user-specified product in brand, location of manufacture, size, or color. In certain embodiments, the alternative product module 212 may determine as alternative products one or more identified products that do not meet the product constraint.

Accordingly, the alternative product module 212 may suggest at least one alternative product by determining a plurality of ingredients for the user-selected product, determining a product class for the user-selected product, and identifying at least one product within the image data having the same ingredients and the same product class as the user-selected product, wherein the alternative product is not a matching product.

In some embodiments, the alternative product module 212 first acquires the list of products identified within the image data and then identifies one or more alternative products. In other embodiments, the alternative product module 212 identifies one or more candidate products based on the user-selection and then compares the candidate products to a list of products identified within the image data to determine whether any candidate products are present within the image data. Candidate products matching products identified within the image data may then be designated as alternative products and suggested to the user.

The price module 214, in one embodiment, is configured to determine a price for the identified plurality of products. The price module 214 may provide the price of a product (e.g., a matching product or alternative product) to the location module 206 and/or display module 218, wherein the location module 206 and/or the display module 218 displays the price for the product at an on-display location near the corresponding product. For example, the price module 214 may cause the display module 218 to superimpose a price for a product as a pop-up window near the location of the corresponding product. In some embodiments, the price module 214 only provides the prices for those products within the image data that are matching products, suggested products, or alternative products.

In some embodiments, the price module 214 searches a database for prices for the identified products. In certain embodiments, the database may be provided by the store where the products are physically located. In other embodiments, the database may be provided by a third-party. The alternative product module 212 may search the database based on a barcode associated with the product or based on product characteristics of the identified products (e.g., name, brand, size).

In certain embodiments, the price module 214 analyses the image data to determine the price for each product. For example, the price module 214 may recognize text of a price tag associated with the product to determine the price of the product. As another example, the price module 214 may recognize a barcode of a product and look up the price for the product from a networked database. As yet another example, the alternative product module 212 may receive the price of a product from a remote server used to identify products within the image data.

The product information module 216, in one embodiment, is configured to determine a plurality of product characteristics for the user-specified product and for each of the identified plurality of products. The plurality of product characteristics includes product information useable to compare one product to another and/or to determine whether a certain product meets a product constraint. Examples of product characteristics include, but are not limited to, product names, product ingredients or components, product identifiers (e.g., product/model numbers), product brands or manufacturers, product origin (e.g., location of manufacture) product sizes, product and/or packaging shapes, and the like.

In some embodiments, the product information module 216 searches a database for product information, either a local database stored in the memory 112 or a remote database accessible via a network interface. For example, the product information module 216 may query a remote server for product characteristics of the user-selected product and each identified product. The product matching module 204 may retrieve a comprehensive list of product characteristics or values for specifically queried product characteristics. In some embodiments, the product information module 216 determines a plurality of product characteristics for each of the identified plurality of products by parsing a response from the remote computer used to identify the products.

The product information module 216 may then provide the product characteristic information to the product matching module 204, the purchase history module 210, the alternative product module 212, and/or the price module 214. For example, the product matching module 204 may compares the product characteristics of the user-specified product to the product characteristics for each of the identified plurality of products based on information received from the product information module 216.

The display module 218, in one embodiment, is configured to visually mark at least one product matching the user-specified product within the image data. The display module 218 may interact with the display 108 to visually mark the location of the matching products. In certain embodiments, the display module 218 dynamically adjusts an on-screen location of the visual marking to correspond to a product's current location, such as where the display is a transparent heads-up display and the product's location varies with respect to the display In some embodiments, the display module 218 may receive instructions and/or data from the any of the location module 206, the purchase history module 210, the alternative product module 212, and the price module 214. For example, the location module 206 may provide an on-display location of a matching product and instruct the display module to draw a highlight or outline around the matching product within the image data so as to indicate its location.

In some embodiments, the display module 218 may display a pop-up window within the image data at a location near a product (e.g., a matching product, a suggested product, and/or an alternative product) and may monitor user input to determine whether the user selects the pop-up window. In response to the user-selecting the pop-up window, the display module 218 may retrieve and display additional information for the product corresponding to the pop-up window. For example, the display module 218 may display a comprehensive list of product attributed in response to the user selecting the pop-up window.

In some embodiments, the display module 218 may be configured to use different visual schemes to visually distinguish between matching products, suggested products, and alternative products. For example, the display module 218 may use different colors, patterns, line thicknesses, and the like when displaying matching products, suggested products, and alternative products. In certain embodiments, the display module 218 receives an indication of whether a product is a matching products, suggested products, or alternative products and applies an appropriate visual mark. In further embodiments, the display module 218 may determine a product to be a matching products, suggested products, or alternative products based on a module indicating the product. For example, products indicated by the location module 206 may be visually marked using a first visual scheme while products indicated by the purchase history module 210 or the alternative product module 212 may be marked using a different visual scheme.

The barcode module 222, in one embodiment, is configured to identify a barcode within image data, the barcode associated with one of the plurality of products within image data, wherein the product image module identifies the plurality of products based on the barcode. In some embodiments, the shape module 226 uses one or more pattern recognition algorithms to identify barcodes in the image data. In certain embodiments, the barcode module 222 decodes the barcode and/or associates the barcode with an object (e.g., a product) within the image data. For example, the barcode module 222 may identify that a product packaging or label includes a barcode or that a shelf label below a product includes a barcode.

Having identified a barcode within the image data, the barcode module 222 may then indicate the barcode to the product image module 202 which, in turn, identifies a product from the image data based on the barcode. While depicted as a part of the image sensor 104, in one embodiment the barcode module 222 is a sub-module of the product image module 202 configured to receive image data and to identify barcodes within image data.

The text module 224, in one embodiment, is configured to identify text within image data, the text associated with one of the plurality of products within image data, wherein the product image module 202 identifies the plurality of products based on the text. In some embodiments, the text module 224 uses one or more pattern recognition algorithms to identify and recognize text in the image data. In certain embodiments, the text module 224 also determines a product associated with the text. For example, the text module 224 may identify that a product packaging or label includes text and may determine the content of said text.

Having identified text within the image data, the text module 224 may then indicate the recognized text to the product image module 202 which, in turn, identifies a product from the image data based on the text. While depicted as a part of the image sensor 104, in one embodiment the text module 224 is a sub-module of the product image module 202 configured to receive image data and to identify text within image data.

The shape module 226, in one embodiment, is configured to identify a shape within image data, the shape associated with of one of the plurality of products within image data, wherein the product image module 202 identifies the plurality of products based on the shape. In some embodiments, the shape module 226 uses one or more pattern recognition algorithms to identify objects (e.g., products) in the image data and to determine their shapes. The shape module 226 may then indicate the determined shapes to the product image module 202 which, in turn, identifies a product from the image data based on the shape.

Having identified a shape within the image data, the shape module 226 may then indicate the determined shape to the product image module 202 which, in turn, identifies a product from the image data based on the shape. While depicted as a part of the image sensor 104, in one embodiment the shape module 226 is a sub-module of the product image module 202 configured to receive image data and to identify shapes within image data.

Figure 3A:
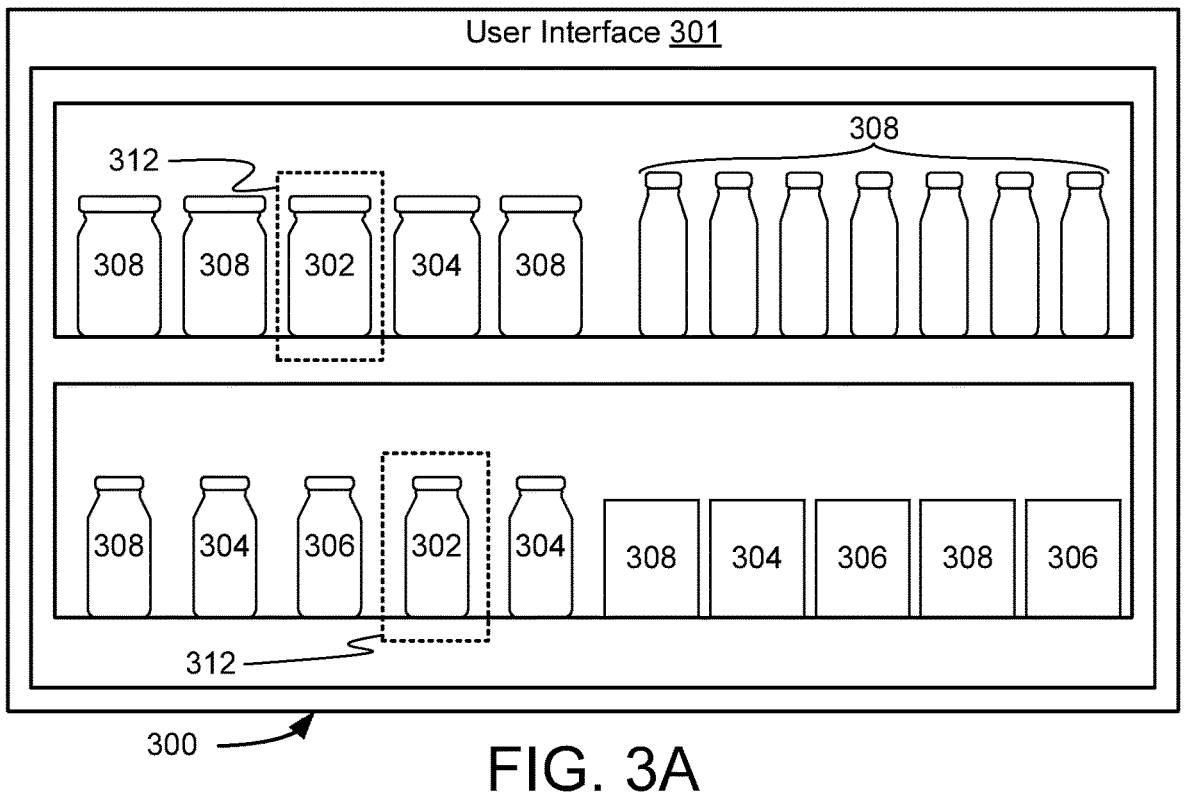
FIG. 3A is a diagram illustrating one embodiment of a user interface of an electronic device for visually indicating a product location.
Figure 3B:
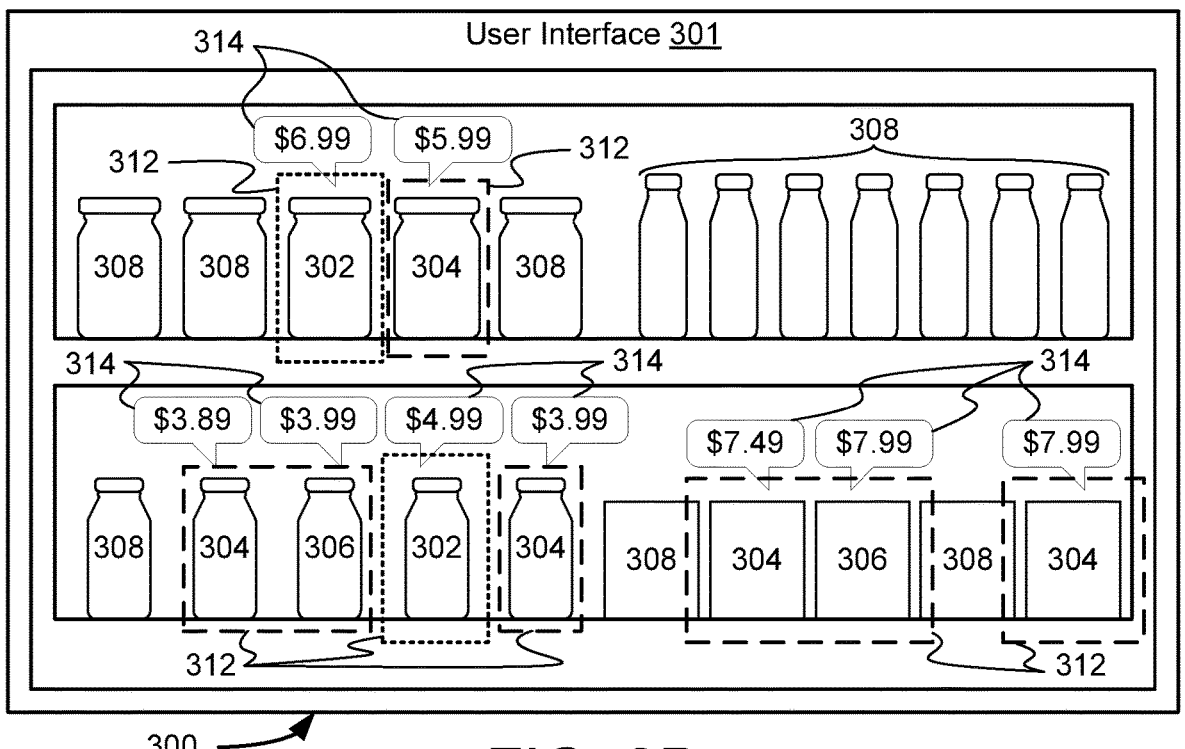
FIG. 3B is a diagram illustrating another embodiment of the user interface of FIG. 3A.

FIGS. 3A-3B depict embodiments of a user interface 301 of a product indicating device 300 for visually indicating a product location. The product indicating device 300, in one embodiment, is substantially similar to the electronic device 101 and/or the apparatus 200 described above with reference to FIGS. 1-2. Accordingly, the product indicating device 300 may include a product indicator module 106 substantially similar to the product indicator module 106 described above wither reference to FIGS. 1-2. As depicted, the product indicating device 300 includes a user interface 301 showing a plurality of products including one or more matching products 302, one or more alternative products 304, one or more suggested products 306, and one or more unrelated products 308.

FIG. 3A depicts one embodiment of the user interface 301 of the device 300, according to embodiments of the disclosure. The product indicating device 300, having received a user selection, captures image data corresponding to the view of the store shelf as seen through the heads-up display and identifies the matching products 302. As described above, a product matching module 204 may identify the matching products based on a comparison of product characteristics for products identified within the image data. The product indicating device 300 may modify the user interface 301 to display a visual mark 312 indicating the location of the matching items 302. Accordingly, the user may quickly identify the on-shelf locations of the matching products 302.

In some embodiments, the product indicating device 300 is a wearable device including a head-mounted, heads-up display capable of reflecting projected images while allowing the user to see through the display. The user interface 301 may be displayed on the transparent heads-up display so that the visual marks 312 correspond to the locations of the matching products 312 as seen through the heads-up display. Accordingly, the product indicating device 300 may dynamically adjust the locations of the visual marks 312 as the user moves his or her head so that the visual marks 312 are always centered on the matching products 302 as seen through the heads-up display.

In some embodiments, the product indicating device 300 is a tablet computer or a smart phone device. In one embodiment, the user interface 301 may include a static image of the store shelf, wherein the visual marks 312 are superimposed on the static image showing the store shelf. In another embodiment, the user interface 301 may include a real-time video image of the store shelf, wherein the product indicating device 300 dynamically adjusts the locations of the visual marks 312 as the user moves the tablet computer or smart phone, so that the visual marks 312 are always centered on the matching products 302 as seen through the real-time video.

FIG. 3B depicts another embodiment of the user interface 301 of the device 300, according to embodiments of the disclosure. Here, the product indicating device 300 causes the user interface 301 to display visual marks 312 indicating the locations of the matching products 302, the alternative products 304, and the suggested products 306. As depicted, the visual marks 312 for matching products 302 may differ from visual marks 312 for alternative products 304 and suggested products 306. Further, the visual marks 312 for alternative products 304 differ from visual marks 312 for suggested products 306. Accordingly, the user may quickly identify distinguish locations of matching products 302 from locations of alternative products 304 or suggested products 306.

As depicted, the product indicating device 300 also modifies the user interface 301 to display prices 314 corresponding to each matching product 302, alternative product 304, and suggested product 306. However, the user interface 301 does not display prices 314 for the unrelated products 308. In some embodiments, the prices 314 may be user selectable, wherein selecting the price 314 causes the user interface 301 to display additional information on the corresponding product, for example one or more product characteristics such as size, brand, and the like.

In some embodiments, the product indicating device 300 is a wearable device including a head-mounted, heads-up display capable of reflecting projected images while allowing the user to see through the display. Accordingly, the product indicating device 300 may dynamically adjust the locations of the visual marks 312 and the prices 314 so that the visual marks 312 and the prices 314 are always centered on the corresponding products as seen through the heads-up display.

In some embodiments, the product indicating device 300 is a tablet computer or a smart phone device. In one embodiment, the user interface 301 may include a static image of the store shelf, wherein the visual marks 312 and the prices 314 are superimposed on the static image showing the store shelf. In another embodiment, the user interface 301 may include a real-time video image of the store shelf, wherein the product indicating device 300 dynamically adjusts the locations of the visual marks 312 and the prices 314 as the user moves the tablet computer or smart phone, so that the visual marks 312 and the prices 314 are always centered on the corresponding products as seen in the real-time video.

Figure 4:
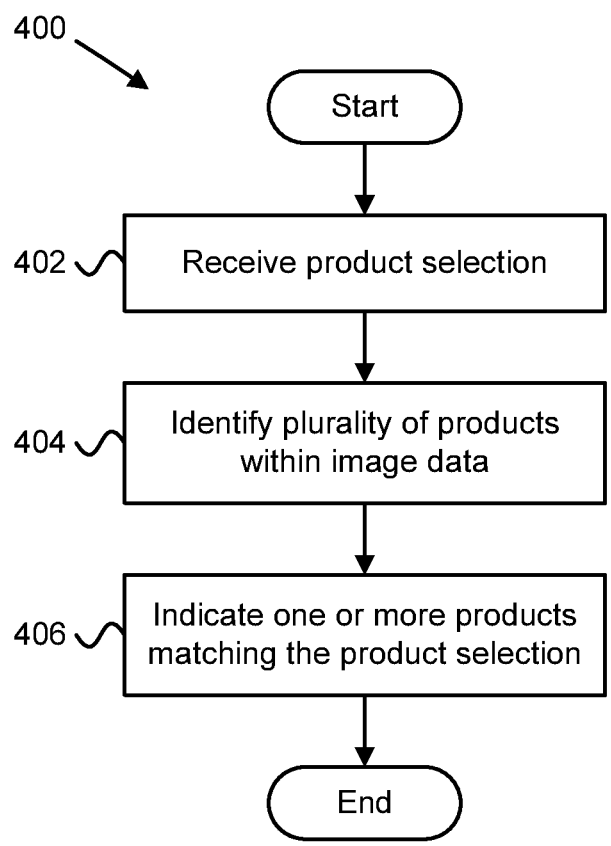
FIG. 4 is a schematic flow chart diagram illustrating one embodiment of a method for visually indicating a product location.

FIG. 4 depicts a method 400 for indicating a product location, according to embodiments of the disclosure. In some embodiments, the method 400 is performed using a wearable user device, such as the electronic device 101, the product indicator module 106, the apparatus 200, and/or the product indicating device 300 described above with reference to FIGS. 1-3. In some embodiments, the method 400 is performed by a processor executing program code, for example, a microcontroller, a microprocessor, a central processing unit (CPU), a graphics processing unit (GPU), an auxiliary processing unit, a FPGA, or the like.

The method 400 begins and the wearable user device receives 402 a product selection from a user. In some embodiments, receiving 402 the product selection includes receiving a user input via an input device. In one embodiment, the user input may include inputted text. For example, the user may type the product selection using a virtual keyboard displayed on a touchscreen. In another embodiment, the user input may include voice. For example, the user may speak the product selection into a microphone and the spoken product selection may be converted to computer-usable text corresponding to the product selection.

In some embodiments, receiving 402 the product selection includes presenting a menu to the user and monitoring for a selection from the menu. The menu may be automatically presented or may be presented in response to a user command. In some embodiments, the menu may be presented to the user in audible form, wherein the user verbally selects a menu item. In further embodiments, the audible menu may comprise a plurality of prompts wherein the product selection is determined based the user's responses to the plurality of prompts. The plurality of prompts, in one embodiment, may include prompts regarding a product's size, color, brand, manufacturer, class or category, and the like.

The wearable user device then identifies 404 a plurality of products within image data. In some embodiments, identifying 404 the plurality of products includes acquiring image data of a scene before the user and performing a visual analysis of the image data. The plurality of products may be identifies 404 based on shape, color, label, and the like. In one embodiment, the identifying 404 the plurality of products includes recognizing text within the image data. In another embodiment, identifying 404 the plurality of products includes analyzing a barcode within the image data.

In certain embodiments, identifying 404 the plurality of products may include sending the image data to a remote server, wherein the remote server analyzes the image data. The remote server may then return a list of the plurality of products within the image data. In certain embodiments, the remote server returns a plurality of characteristics for each identified product. In further embodiments, the remote server may also return locations within the image data of each identified product.

Next, the wearable user device indicates 406 one or more products matching the product selection. In some embodiments, indicating 406 the one or more products matching the product selection includes comparing characteristics of the identified products to the product selection. For example, the product matching module 204 may compare characteristics of an identified product to those the product selection to determine a matching product. Examples of comparable product characteristics include, but are not limited to, product names, product ingredients or components, product identifiers (e.g., product/model numbers), product brands or manufacturers, product sizes, and the like.

In some embodiments, indicating 406 the one or more products matching the product selection includes specifying a location of the one or more matching products. For example, the location module 206 may indicate a product's location on the shelf. In certain embodiments, indicating 406 the one or more products matching the product selection includes visually marking a product's location. For example, the location module 206 may visually mark a product's location by highlighting or outlining the product within the image data. In further embodiments, indicating 406 the one or more products matching the product selection may include dynamically adjusting the location of the visual marking to correspond to a product's current location. The method 400 ends.

Figure 5:
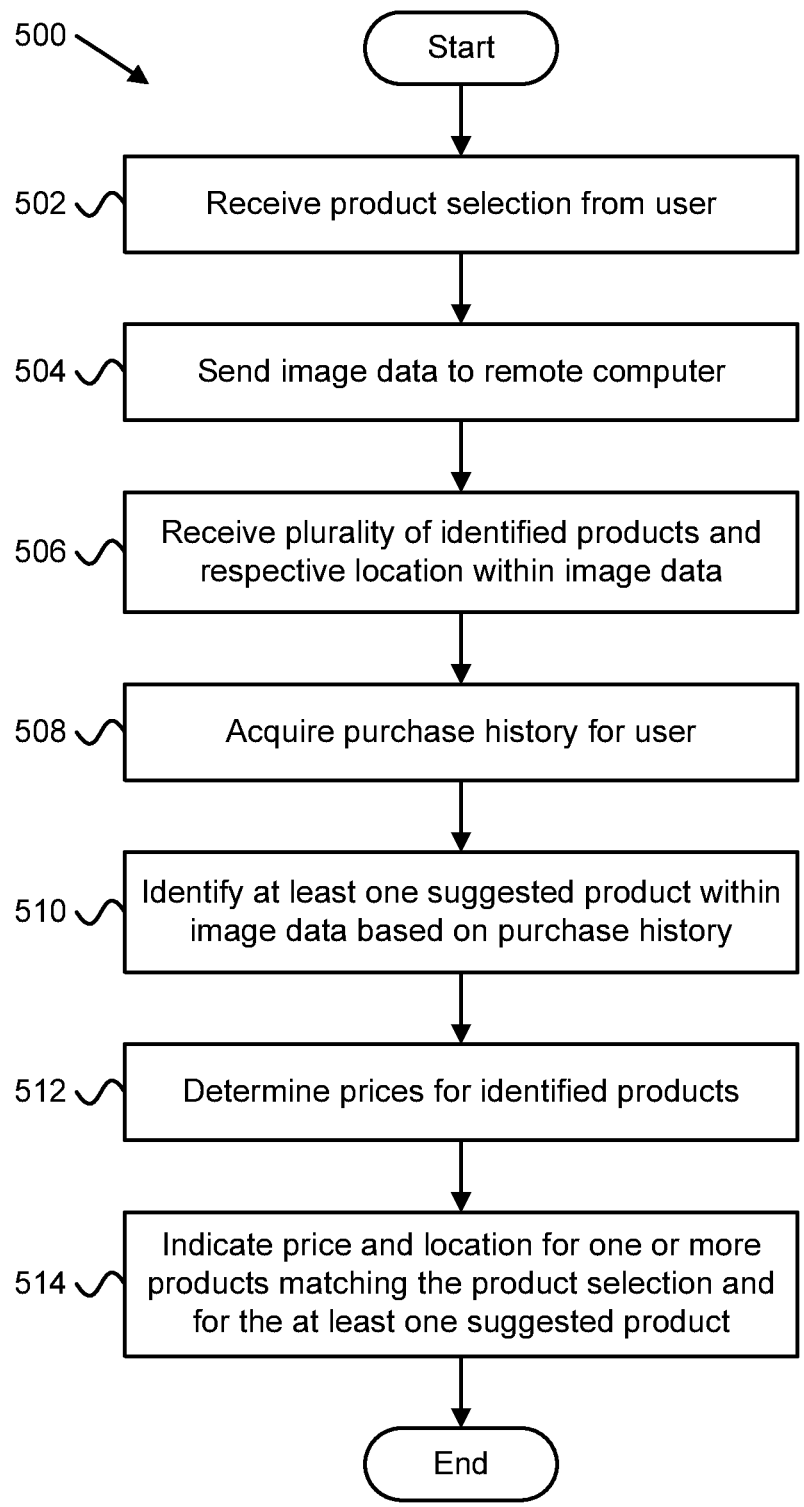
FIG. 5 is a schematic flow chart diagram illustrating another embodiment of a method for visually indicating a product location.

FIG. 5 depicts a method 500 for visually indicating a product location, according to embodiments of the disclosure. In some embodiments, the method 500 is performed using a wearable user device, such as the electronic device 101, the product indicator module 106, the apparatus 200, and/or the product indicating device 300 described above with reference to FIGS. 1-3. In some embodiments, the method 500 is performed by a processor executing program code, for example, a microcontroller, a microprocessor, a central processing unit (CPU), a graphics processing unit (GPU), an auxiliary processing unit, a FPGA, or the like.

The method 500 begins and the wearable user device receives 502 a product selection from a user. In some embodiments, receiving 502 the product selection includes receiving a user input via an input device. In one embodiment, the user input may include inputted text. For example, the user may type the product selection using a virtual keyboard displayed on a touchscreen. In another embodiment, the user input may include voice. For example, the user may speak the product selection into a microphone and the spoken product selection may be converted to computer-usable text corresponding to the product selection.

In some embodiments, receiving 502 the product selection includes presenting a menu to the user and monitoring for a selection from the menu. The menu may be automatically presented or may be presented in response to a user command. In some embodiments, the menu may be presented to the user in audible form, wherein the user verbally selects a menu item. In further embodiments, the audible menu may comprise a plurality of prompts wherein the product selection is determined based the user's responses to the plurality of prompts. The plurality of prompts, in one embodiment, may include prompts regarding a product's size, color, brand, manufacturer, class or category, and the like.

The wearable user device then sends 504 image data to a remote computer. For example, the product image module 202 may send the image data using a wired data link, a wireless data link, or a combination of wired and wireless data links. In certain embodiments, the wearable user device formats the image data into one or more data packets consistent with known communication protocols. In some embodiments, sending 504 the image data includes establishing a network connection between the wearable user device and a computer data network, such as the internet, that links the wearable user device to the remote computer. In one embodiment, the remote computer is a networked server configured to analyze image data and identify products within the image data.

Next, the wearable user device receives 506 a plurality of identified products from the remote computer, as well as the respective locations within the image data of each identified product. In some embodiments, receiving 506 the identified products includes receiving a table, or other suitable data structure, including an entry for each identified product, each entry including a product name, one or more characteristics (e.g., ingredients) of the product, and a location within the image data for the product. In certain embodiments, receiving 506 the identified products includes receiving prices for each identified product.

The wearable user device then acquires 508 a purchase history for the user. For example, the purchase history module 210 may acquire a user's purchase history from a store rewards program, a bank card or bank statement, and/or from scanned receipts belonging to the user. In some embodiments, acquiring 508 a purchase history for the user may include inferring a purchase history based on a user-inputted shopping list.

Next, the wearable user device identifies 510 at least one suggested product within the image data based on the purchase history. In some embodiments, identifying 510 at least one suggested product includes comparing the items of the purchase history to the plurality of identified products and identifying any matches. For example, a list of previously purchased products may be parsed and compared to a list of products identified within the image data. Identifying 510 at least one suggested product would then include identifying at least one product common to both the lists.

The wearable user device then determines 512 prices for the identified products. In some embodiments, determining 512 prices includes searching a database for prices for the identified products. In certain embodiments, the database may be provided by the store where the products are physically located. In other embodiments, the database may be provided by a third-party. In some embodiments, determining 512 prices includes analyzing the image data to identify prices for the identified products. In certain embodiments, the prices may be marked on the products (e.g., by a sticker or label) or marked on shelving adjacent to the product. In certain embodiments, determining 512 prices includes retrieving price information from a table of identified products received from the remote computer, the table including characteristics (including name and price) of each identified product and a location within the image data for each identified product.

Next, the wearable user device indicates 514 the price and location for one or more products matching the product selection and for the at least one suggested product. In some embodiments, indicating 514 the price and location for products matching the product selection includes determining whether an identified product matches the product selection by comparing the identified products to the product selection. For example, the product matching module 204 may compare characteristics of an identified product to those the product selection to determine a matching product. Examples of comparable product characteristics include, but are not limited to, product names, product ingredients or components, product identifiers (e.g., product/model numbers), product brands or manufacturers, product sizes, and the like.

In some embodiments, indicating 514 the location for one or more products matching the product selection and for the at least one suggested product includes specifying an on-shelf location of the products. In certain embodiments, indicating 514 the location for one or more products matching the product selection and for the at least one suggested product includes visually marking a product's location within the image data. For example, the location module 206 may visually mark a product's location by highlighting or outlining the product within the image data. In further embodiments, indicating 514 the location for one or more products matching the product selection may include dynamically adjusting an on-screen location of the visual marking to correspond to a product's current location, such as where the display is a transparent heads-up display.

In some embodiments, indicating 514 the price for the one or more products matching the product selection and for the at least one suggested product includes displaying the determined price on the image data at a location adjacent to the corresponding product. For example, the price module 214 may superimpose a price for a product as a pop-up window near the location of the corresponding product. The method 500 ends.

Figure 6:
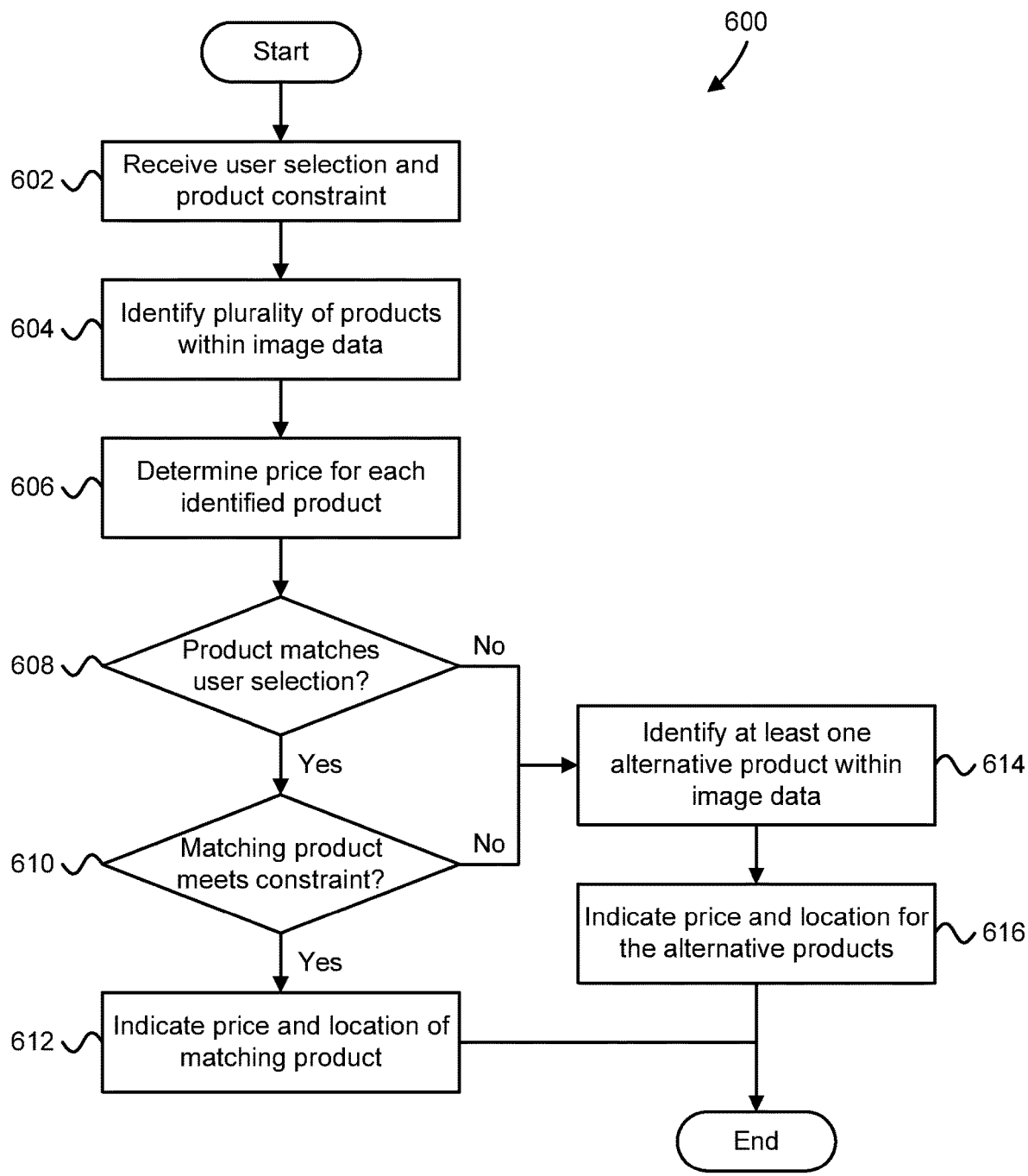
FIG. 6 is a schematic flow chart diagram illustrating another embodiment of a method for visually indicating a product location.

FIG. 6 depicts a method 600 for visually indicating a product location, according to embodiments of the disclosure. In some embodiments, the method 600 is performed using a wearable user device, such as the electronic device 101, the product indicator module 106, the apparatus 200, and/or the product indicating device 300 described above with reference to FIGS. 1-3. In some embodiments, the method 600 is performed by a processor executing program code, for example, a microcontroller, a microprocessor, a central processing unit (CPU), a graphics processing unit (GPU), an auxiliary processing unit, a FPGA, or the like.

The method 600 begins and the wearable user device receives 602 a product selection and a product constraint from a user. In some embodiments, receiving 602 the product selection and product constraint includes receiving a user input via an input device. In one embodiment, the user input may include inputted text. For example, the user may type the product selection and/or product constraint using a virtual keyboard displayed on a touchscreen. In another embodiment, the user input may include voice. For example, the user may speak the product selection into a microphone and the spoken product selection and/or product constraint may be converted to computer-usable text corresponding to the product selection and/or product constraint.

In some embodiments, receiving 602 the product selection and/or product constraint includes presenting a menu to the user and monitoring for a selection from the menu. The menu may be automatically presented or may be presented in response to a user command. In some embodiments, the menu may be presented to the user in audible form, wherein the user verbally selects a menu item. In further embodiments, the audible menu may comprise a plurality of prompts wherein the product selection and/or product constraint is determined based the user's responses to the plurality of prompts. The plurality of prompts, in one embodiment, may include prompts regarding a product's size, color, brand, manufacturer, class or category, and the like.

The wearable user device then identifies 604 a plurality of products within image data. In some embodiments, identifying 604 the plurality of products includes performing a visual analysis of the image data. The plurality of products may be identifies 604 based on shape, color, label, and the like. In one embodiment, the identifying 604 the plurality of products includes recognizing text within the image data. In another embodiment, identifying 604 the plurality of products includes analyzing a barcode within the image data.

In certain embodiments, identifying 604 the plurality of products may include sending the image data to a remote server, wherein the remote server analyzes the image data. The remote server may then return a list of the plurality of products within the image data. In certain embodiments, the remote server returns a plurality of characteristics for each identified product. In further embodiments, the remote server may also return one or more characteristics of each identified product, such as price, ingredients/components, or the location within the image data of the identified product.

Next, the wearable user device determines 606 prices for the identified products. In some embodiments, determining 606 prices includes searching a database for prices for the identified products. In certain embodiments, the database may be provided by the store where the products are physically located. In other embodiments, the database may be provided by a third-party. In some embodiments, determining 606 prices includes analyzing the image data to identify prices for the identified products. In certain embodiments, the prices may be marked on the products (e.g., by a sticker or label) or marked on shelving adjacent to the product. In certain embodiments, determining 606 prices includes retrieving price information from a table of identified products received from the remote server, the table including attributes (including name and price) of each identified product and a location within the image data for each identified product.

The wearable user device then determines 608 whether an identified product matches the user selection. In some embodiments, determining 608 whether an identified product matches the user selection includes, for each identified product, comparing attributes of the identified product to attributes of the user selection. Comparable attributes include, but are not limited to, product name, brand/manufacturer, and the like.

If an identified product matches the user selection, then the wearable user device proceeds to determine 610 whether the matching product meets the product constraint. Otherwise, if none of the identified products match the user selection, then the wearable user device identifies 614 at least one alternative product within the image data.

Determining 610 whether the matching product meets the product constraint includes comparing the product constraint to one or more product characteristics of the matching product. Examples of product constraints include, but are not limited to, that the product includes a specific ingredient or component, that the product does not include a specific ingredient or component, that the product is within a certain size range or price range, that a product characteristic has a certain value, and the like. Thus, determining 610 whether the matching product meets the product constraint may include filter a list of otherwise-matching products to include only those with a specific product constraint.

If the matching product meets the product constraint, then the wearable user device indicates 612 the price and location of the matching product. Otherwise, if the matching product does not meet the product constraint, then the wearable user device identifies 614 at least one alternative product within the image data.

Indicating 612 the price and location of the matching product includes indicating the price and location for each of the identified plurality of products that match the user selection and meet the product constraint. In some embodiments, indicating 612 the price and location for the matching product includes specifying an on-shelf location of the products. In certain embodiments, indicating 612 the location for the matching product includes visually marking a product's location within the image data. For example, the location module 206 may visually mark a product's location by highlighting or outlining the product within the image data. In some embodiments, indicating 612 the price for the matching product includes displaying the determined price on the image data at a location adjacent to the corresponding product.

Identifying 614 at least one alternative product within the image data includes identifying at least one product similar to the user-specified product, but differing in a particular characteristics (e.g., not a matching product). In some embodiments, identifying 614 at least one alternative product includes selecting alternative products that differing in only one or two product characteristics from the user-selected product.

In some embodiments, identifying 614 at least one alternative product includes identifying one or more generic products corresponding to the user-specified product. For example, if the user-specified product is a brand-name skin care product, the alternative product module 212 may query a network database to identify one or more generic skin care products corresponding to the brand-name skin care product. In some embodiments, identifying 614 at least one alternative product includes identifying a class or category associated with the user-selected product and determines one or more alternative products based on the class or category.

Next, the wearable user device indicates 612 the price and location of the at least one alternative product. In some embodiments, indicating 612 the price and location of the at least one alternative product includes specifying an on-shelf location of the alternative products. In certain embodiments, indicating 612 the location for the at least one alternative product includes visually marking a product's location within the image data. In some embodiments, indicating 612 the price for the at least one alternative product includes displaying the determined price on the image data at a location adjacent to the corresponding product. The method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
an image sensor that captures image data;
a display that presents a user interface, wherein images corresponding to the image data are visible through the user interface;
a processor;
a memory that stores code executable by the processor to:
identify a plurality of products within the image data;
determine price information and composition information for each of the identified plurality of products;
receive an input from a user, the input indicating a product selection and a product constraint, wherein the product constraint is a specific ingredient to be excluded from a matching product;
identify a first set of products from the identified at least one product, the first set of products matching the product selection and complying with the product constraint,
wherein identifying the first set of products comprises determining a plurality of ingredients for the product selection, wherein each product in the first set of products contains the plurality of ingredients;
modify the user interface to display a first visual indication corresponding to a location of each product in the first set of products in the user interface;
identify a set of alternative products from the identified at least one product, the set of alternative products complying with the product constraint and differing from the product selection by at least one product characteristic,
wherein identifying the set of alternative products comprises determining a product class for the product selection, wherein each alternative product in the set of alternative products matches the product class for the product selection;
modify the user interface to display a second visual indication corresponding to a location of each alternative product in the user interface;
access a purchase history corresponding to a user of the apparatus;
identify a suggested product within the image data, the suggested product matching a purchase trend of the user indicated by the purchase history;
modify the user interface to display a third visual indication corresponding to a location of the suggested product; and
modify the user interface to display price information at a location adjacent to the first set of products, a location adjacent to the suggested product and a location adjacent to the set of alternative products.

2. The apparatus of claim 1, wherein identifying the first set of product comprises the processor determining a plurality of product characteristics for the product selection and for the identified plurality of products and comparing the product characteristics of the product selection to the plurality of product characteristics for each identified product, the plurality of product characteristics comprising at least two of: active ingredient, other ingredients, brand, manufacturer, location of manufacture, size, shape, color, packaging, and product class.

3. The apparatus of claim 1, wherein the processor further identifies a barcode within the image data, the barcode associated with an item within image data, wherein identifying the plurality of products within the image data comprises identifying the at least one product based on the barcode.

4. The apparatus of claim 1, wherein the processor sends the image data to a remote computer for image analysis and receives, from the remote computer, a list of products identified within the image data.

5. The apparatus of claim 1, wherein the processor further presents a pop-up window on the display, the pop-up window containing one or more of: price information of a product in the first set of products, a link to a detailed product description for a product of the first set of products, product characteristics for a product of the first set of products, a comparison of two or more products matching one or more of: the product selection and the product constraint, and a link to a comparison of two or more products matching one or more of: the product selection and the product constraint.

6. The apparatus of claim 1, wherein the product selection comprises a named product, the named product comprising an active ingredient, wherein identifying at least one alternative product based on the product selection comprises: identifying at least one alternative product having the same active ingredient as the named product.

7. The apparatus of claim 1, wherein the processor further identifies a purchase date for the suggested product, wherein modifying the user interface to display a third visual indication occurs in response to the purchase date exceeding a threshold amount of time.

8. A method comprising:
receiving, by use of a processor, image data;
presenting a user interface, wherein images corresponding to the image data are visible through the user interface;
receiving a product selection and a product constraint from a user, the product constraint being at least one specific ingredient to be excluded from a matching product;
identifying a plurality of products within the image data;
identifying a first set of products from the identified plurality of products, the first set of products matching the product selection and not containing the product constraint,
wherein identifying the first set of products comprises determining a plurality of ingredients for the product selection, wherein each product in the first set of products contains the plurality of ingredients;
modifying the user interface to display a first visual indication corresponding to a location of the first set of products within the user interface;
identifying a set of alternative products from the identified at least one product, the set of alternative products not containing the product constraint and differing from the product selection by at least one product characteristic,
wherein identifying the set of alternative products comprises determining a product class for the product selection, wherein each alternative product in the set of alternative products matches the product class for the product selection;
modifying the user interface to display a second visual indication corresponding to a location of each alternative product in the user interface;

obtaining a purchase history corresponding to a user;
identifying a suggested product within the image data, the suggested product matching a purchase trend of the user indicated by the purchase history;
modifying the user interface to display a third visual indication corresponding to a location of the suggested product; and
inserting price information into the user interface at a location adjacent to the first set of products, a location adjacent to the suggested product and a location adjacent to the set of alternative products.

9. The method of claim 8, wherein the product selection comprises a named product, the named product comprising an active ingredient, wherein identifying at least one alternative product based on the product selection comprises: identifying at least one alternative product having the same active ingredient as the named product.

10. The method of claim 8, wherein identifying a suggested product within the image data comprises:
identifying one or more previously purchased products based on the purchase history;
determining whether the one or more previously purchased products are present within the image data; and
suggesting the one or more previously purchased products to the user, in response to the one or more previously purchased products being present within the image data.

11. The method of claim 8, wherein receiving the product selection from the user comprises receiving a search constraint from the user, wherein identifying the first set of products from the identified plurality of products comprises comparing the identified plurality products to the search constraint.

12. The method of claim 8, wherein identifying a plurality of products from image data comprises:
transmitting the image data to a remote computer for image analysis; and
receiving, from the remote computer, a list of products within the image data and a list of locations within the image data for each listed product.

13. The method of claim 8, further comprising:
presenting a pop-up window on the display, the pop-up window containing one or more of: price information of a product in the first set of products, a link to a detailed product description for a product of the first set of products, product characteristics for a product of the first set of products, a comparison of two or more products matching one or more of: the product selection and the product constraint, and a link to a comparison of two or more products matching one or more of: the product selection and the product constraint.

14. The method of claim 8, further comprising identifying a purchase date for the suggested product, wherein modifying the user interface to display a third visual indication occurs in response to the purchase date exceeding a threshold amount of time.

15. A system comprising:
an image sensor that captures real-time image data, wherein the real-time image data changes with user movement;
a display that presents a user interface, wherein images corresponding to the real-time image data are visible through the user interface;
a processor; and a memory that stores code executable by the processor to:
receive, from a user, a product selection and at least one product constraint, wherein the product constraint is a specific ingredient to be excluded from a matching product;
identify a plurality of products within the real-time image data;
determine price information and composition information for each of the identified plurality of products;
identify a first set of products matching the product selection and complying with the product constraint, the first set of products being a subset of the identified plurality of products,
wherein identifying the first set of products comprises determining a plurality of ingredients for the product selection, wherein each product in the first set of products contains the plurality of ingredients;
modify the user interface to display a first visual indication corresponding to an on-screen location of the first set of products;
identify a set of alternative products from the identified at least one product, the set of alternative products complying with the product constraint and differing from the product selection by at least one product characteristic,
wherein identifying the set of alternative products comprises determining a product class for the product selection, wherein each alternative product in the set of alternative products matches the product class for the product selection;
modify the user interface to display a second visual indication corresponding to a location of each alternative product in the user interface;
access a purchase history corresponding to a user of the apparatus;
identify a suggested product within the image data, the suggested product matching a purchase trend of the user indicated by the purchase history;
modify the user interface to display a third visual indication corresponding to a location of the suggested product;
adjust a position of the first, second and third visual indications within the user interface to correspond to current on-screen locations of the first set of products, the suggested product and the set of alternative products as the real-time image data changes; and
modify the user interface to display price information of the first set of products, the suggested product and the set of alternative products at locations adjacent to the first set of products, the suggested product and the set of alternative products.

16. The system of claim 15, wherein the processor further presents a pop-up window on the display, the pop-up window containing one or more of: price information of a product in the first set of products, a link to a detailed product description for a product of the first set of products, product characteristics for a product of the first set of products, a comparison of two or more products matching one or more of: the product selection and the product constraint, and a link to a comparison of two or more products matching one or more of: the product selection and the product constraint.

17. The system of claim 15, wherein the product selection comprises a named product, the named product comprising an industry certification, wherein identifying at least one alternative product based on the product selection comprises:

identifying at least one alternative product having the same industry certification as the named product.

18. The system of claim 15, wherein receiving the product selection comprises one or more of receiving voice input from the user and receiving a shopping list.

19. The system of claim 15, further comprising code to identify a purchase date for the suggested product, wherein modifying the user interface to display a third visual indication occurs in response to the purchase date exceeding a threshold amount of time.

* * * * *